(12) United States Patent
Takechi (10) Patent No.: US 11,490,606 B2
(45) Date of Patent: Nov. 8, 2022

(54) SUPPORT STRUCTURE FOR FISHING REEL

(71) Applicant: Shimano Inc., Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/390,161

(22) Filed: Jul. 30, 2021

(65) Prior Publication Data

US 2022/0071187 A1 Mar. 10, 2022

(30) Foreign Application Priority Data

Sep. 8, 2020 (JP) .............................. JP2020-150876

(51) Int. Cl.
*A01K 89/01* (2006.01)
*A01K 89/015* (2006.01)
*A01K 89/00* (2006.01)

(52) U.S. Cl.
CPC ...... *A01K 89/01931* (2015.05); *A01K 89/006* (2013.01); *A01K 89/0193* (2015.05)

(58) Field of Classification Search
CPC ............ A01K 89/0183; A01K 89/0193; A01K 89/006; A01K 89/01082; A01K 89/01085
See application file for complete search history.

(56) References Cited

U.S. PATENT DOCUMENTS

2017/0164593 A1* 6/2017 Ochiai ........... A01K 89/011222
2019/0191681 A1* 6/2019 Ochiai ............. A01K 89/01082

FOREIGN PATENT DOCUMENTS

JP 2009-5637 A 1/2009

* cited by examiner

*Primary Examiner* — Emmanuel M Marcelo
(74) *Attorney, Agent, or Firm* — Global IP Counselors, LLP (57) ABSTRACT

A support structure for a fishing reel includes a first portion, a second portion, a first shaft bearing and a second shaft bearing arranged side by side in the axial direction along an axis between the outer circumferential surface of the first portion and the inner circumferential surface of the second portion, a spacer disposed between an inner race of the first shaft bearing and an inner race of the second shaft bearing, and a regulating member configured to restrict movement an outer race of the first shaft bearing or an outer race of the second shaft bearing, in a direction in which one of the outer race of the first shaft bearing or the outer race of the second shaft bearing is separated from the other of the outer race of the first shaft bearing or the outer race of the second shaft bearing.

7 Claims, 10 Drawing Sheets

SUPPORT STRUCTURE FOR FISHING REEL

CROSS-REFERENCE TO RELATED APPLICATIONS

This application claims priority to Japanese Patent Application No. 2020-150876, filed on Sep. 8, 2020. The entire disclosure of Japanese Patent Application No. 2020-150876 is hereby incorporated herein by reference.

BACKGROUND

Field of the Invention

The present invention relates to a support structure for a fishing reel.

Background Art

In conventional fishing reels, such as dual-bearing reels, a support structure for rotatably supporting the handle shaft on the reel body (right frame) has been disclosed (for example, Japanese Laid-Open Patent Application No. 2009-005637). In the support structure, a biasing member is disposed between the distal end of the handle shaft and the axial direction of the right frame. The rattling of the handle shaft in the axial direction is suppressed by this biasing member.

SUMMARY

In the conventional support structure of a dual-bearing reel, a biasing member is disposed between the distal end of the handle shaft and the axial direction of the right frame in order to suppress the rattling of the handle shaft in the axial direction. In this case, the handle shaft rotates in a state in which the distal end of the handle shaft is pressed by the biasing member, and friction is thus generated between the distal end of the handle shaft and the biasing member. As a result of this friction, the handle shaft, serving as a member having a first portion, may not be capable of rotating smoothly with respect to the right frame serving as a member having a second portion.

Embodiments of the present invention were made in view of the above-described problem, and the object of the present invention is to provide a support structure for a fishing reel with which the rattling of a first portion with respect to a second portion can be suppressed, and by which the first portion can rotate smoothly with respect to the second portion.

A support structure for a fishing reel according to one aspect of the present invention comprises a first portion, a second portion, a first shaft bearing, a second shaft bearing, a spacer, and a regulating member. The first portion is formed in the shape of a shaft. The first portion has an outer circumferential surface. The second portion has an inner circumferential surface. The inner circumferential surface is disposed opposite the outer circumferential surface in the radial direction away from the axis of the first portion. The first shaft bearing and the second shaft bearing are arranged axially side by side along the axis between the outer circumferential surface of the first portion and the inner circumferential surface of the second portion.

The spacer is disposed between the inner race of the first shaft bearing and the inner race of the second shaft bearing. The regulating member restricts the movement of either the outer race of the first shaft bearing or the outer race of the second shaft bearing, in a direction in which one of either the outer race of the first shaft bearing or the outer race of the second shaft bearing is separated from the other element, that is, either the outer race of the second shaft bearing or the outer race of the first shaft bearing. As a result, the axial distance between the outer race of the first shaft bearing and the outer race of the second shaft bearing is smaller than the axial distance between the inner race of the first shaft bearing and the inner race of the second shaft bearing.

In an embodiment of the present support structure for a fishing reel, the spacer is disposed between the inner race of the first shaft bearing and the inner race of the second shaft bearing. In this state, the regulating member restricts movement of either the outer race of the first shaft bearing or the outer race of the second shaft bearing, in a direction in which one of either the outer race of the first shaft bearing or the outer race of the second shaft bearing is separated from the other element, that is, either the outer race of the second shaft bearing or the outer race of the first shaft bearing. As a result, the axial distance between the outer race of the first shaft bearing and the outer race of the second shaft bearing is smaller than the axial distance between the inner race of the first shaft bearing and the inner race of the second shaft bearing.

In this manner, the movement of either the outer race of the first shaft bearing or the outer race of the second shaft bearing is restricted by the regulating member in a direction in which the outer race of the first shaft bearing or the outer race of the second shaft bearing separates from the outer race of the other shaft bearing. As a result, since the internal gap between the first shaft bearing and the second shaft bearing is smaller, it is possible to suppress the rattling of the first portion with respect to the second portion. In addition, in this embodiment, since the friction is not generated in the first portion, as in the prior art, the first portion can be smoothly rotated with respect to the second portion.

A support structure for a fishing reel according to another aspect of the present invention preferably further comprises a positioning member. The positioning member positions the inner race of the first shaft bearing, the inner race of the second shaft bearing, and the spacer in the axial direction with respect to the first portion.

In this embodiment, the first shaft bearing, the second shaft bearing, and the spacer can be easily positioned in the axial direction with respect to the first portion by the positioning member.

In a support structure for a fishing reel according to another aspect of the present invention, the first portion preferably has a first contact surface. One of either the inner race of the first shaft bearing or the inner race of the second shaft bearing makes contact with the first contact surface in the axial direction. The positioning member positions the other element, that is, either the inner race of the second shaft bearing or the inner race of the first shaft bearing, at a prescribed position with respect to the first contact surface.

In this embodiment, the first shaft bearing, the second shaft bearing, and the spacer can be reliably positioned in the axial direction with respect to the first portion by the positioning member and the first contact surface.

In a support structure for a fishing reel according to another aspect of the present invention, the second portion preferably has a second contact surface. The other of either the inner race of the second shaft bearing or the inner race of the first shaft bearing makes contact with the second contact surface in the axial direction.

In this embodiment, the first shaft bearing and the second shaft bearing can be easily positioned in the axial direction with respect to the second portion.

A support structure for a fishing reel according to another aspect of the present invention preferably further comprises an elastic member. The elastic member is disposed between the second portion and the other of either the outer race of the second shaft bearing or the outer race of the first shaft bearing in the axial direction.

In this case, the arrangement of the elastic member enables a preload to act on the first shaft bearing and the second shaft bearing, and allows easy adjustment of the preload. In addition, if external vibrations are applied to the first shaft bearing and the second shaft bearing, such vibrations can be absorbed by the elastic member.

A fishing reel according to one aspect of the present invention comprises a spool around which a fishing line is wound, a handle assembly that is operated in order to wind the fishing line around the spool, and the support structure described above that is disposed between the spool and the handle assembly.

The support structure has a drive shaft to which the handle assembly is connected and a reel body that supports the drive shaft so as to be rotatable. The first portion of the support structure described above is included in the drive shaft. The second portion of the support structure described above is included in the reel body.

In this manner, even if the support structure is composed of the drive shaft and the reel body, the same effect as described above can be obtained.

A fishing reel according to one aspect of the present invention comprises a reel body, a drive shaft that is supported by the reel body so as to be rotatable, and a handle assembly that is connected to the drive shaft and that has the support structure described above. The handle assembly has a handle knob and a knob shaft that supports the handle knob so as to be rotatable. The first portion of the support structure described above is included in the knob shaft. The second portion of the support structure described above is included in the handle knob.

In this manner, even if the support structure is composed of the handle knob and the knob shaft of the handle assembly, the same effect as described above can be obtained.

In the embodiments of the present invention, it is possible to suppress rattling of the first portion with respect to the second portion and to smoothly rotate the first portion with respect to the second portion in a support structure for a fishing reel.

DETAILED DESCRIPTION OF EMBODIMENTS

Figure 1:
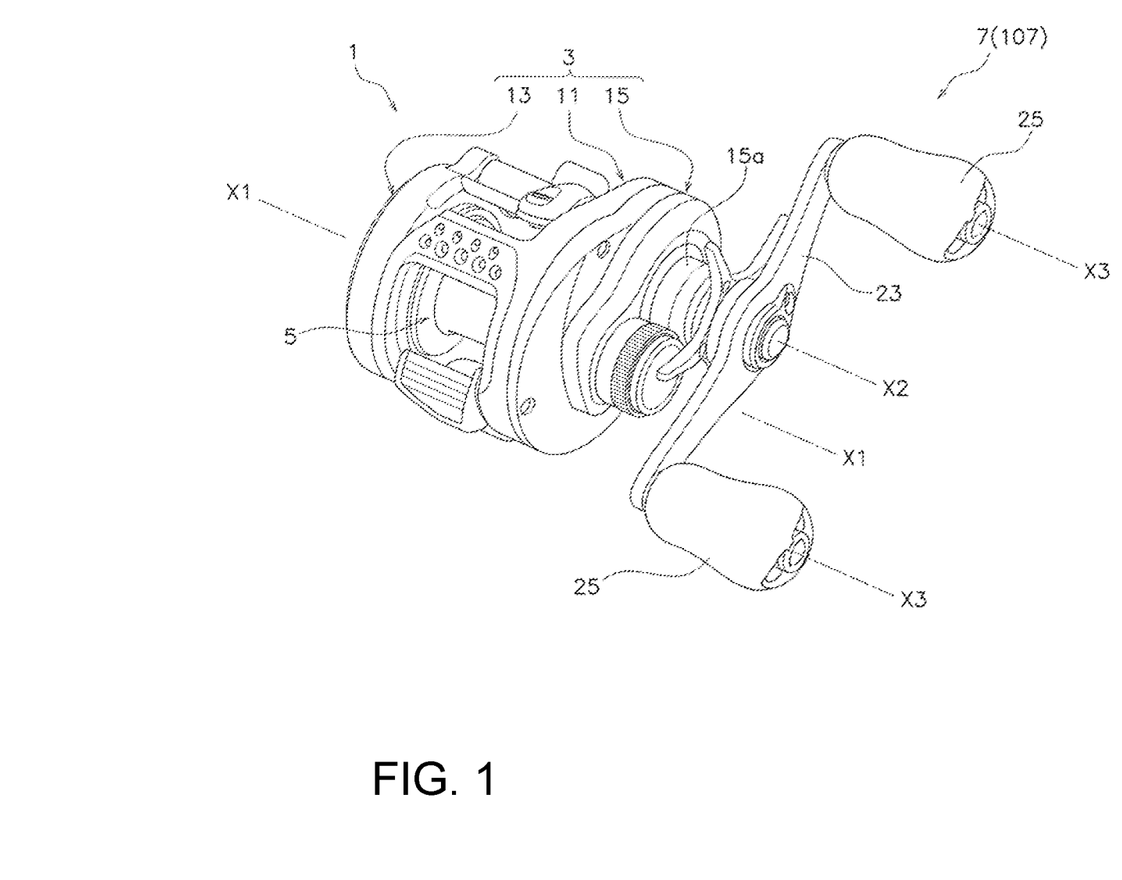
FIG. 1 is an external perspective view of a dual-bearing reel in which a first embodiment of the present invention is employed.
Figure 2:
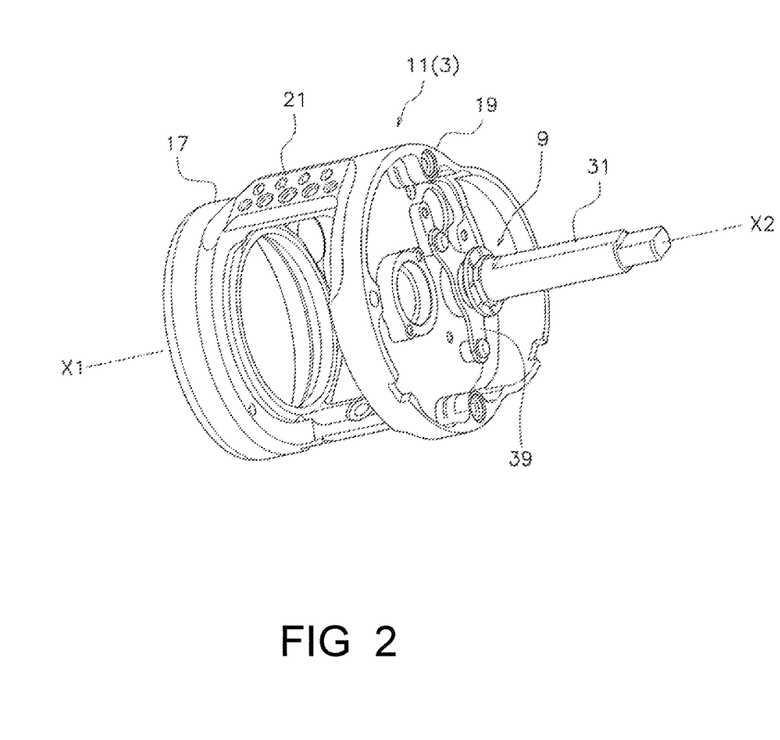
FIG. 2 is an external perspective view of a frame and a first support structure.

As shown in FIGS. 1 and 2, a dual-bearing reel 1 (one example of a fishing reel) according to an embodiment of the present invention comprises a reel body 3, a spool 5, a handle assembly 7, and a first support structure 9 (refer to FIG. 2).

The reel body 3 is configured so as to be mountable on a fishing rod. As shown in FIG. 2, the reel body 3 supports a handle shaft 31 so as to be rotatable via the first support structure 9. As shown in FIG. 1, the reel body 3 includes a frame 11, a first side cover 13, and a second side cover 15.

Figure 3:
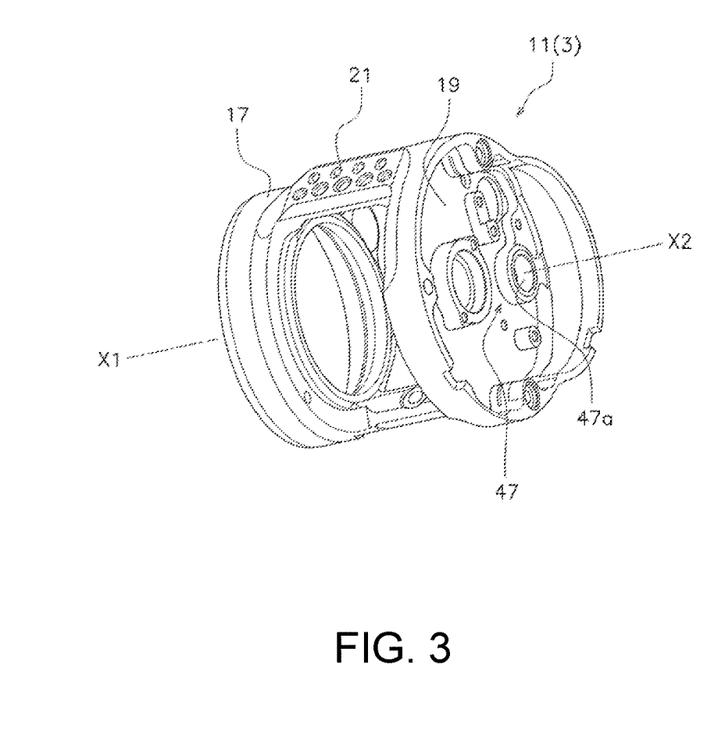
FIG. 3 is an external perspective view of the frame.

As shown in FIG. 3, the frame 11 has a first side plate 17, a second side plate 19, and a connecting portion 21. The first side plate 17 and the second side plate 19 are disposed separately from each other in the axial direction along axis X1 of the spool shaft. The connecting portion 21 connects the first side plate 17 and the second side plate 19. The first side plate 17, the second side plate 19, and the connecting portion 21 are integrally formed.

As shown in FIG. 1, the first side cover 13 and the second side cover 15 cover both sides of the frame 11. The first side cover 13 and the second side cover 15 are separately attached to the two sides of the frame 11. For example, the first side cover 13 is attached to the first side plate 17 on the opposite side of the handle assembly 7. The second side cover 15 is attached to the second side plate 19 between the handle assembly 7 and the second side plate 19. The second side cover 15 has a boss portion 15a. The handle shaft 31 (refer to FIG. 2) is inserted through the boss portion 15a.

As shown in FIGS. 1 and 2, the first support structure 9 is disposed between the second side plate 19 of the handle assembly 7. In addition, a rotation transmission mechanism (not shown) that transmits the rotation of the handle shaft 31 to the spool shaft is disposed between the second side plate 19 and the second side cover 15. For example, the rotation transmission structure includes a drive gear, a pinion gear, etc.

A fishing line is wound around the spool 5. As shown in FIG. 1, the spool 5 is disposed between the first side plate 17 and the second side plate 19. The spool 5 is fixed to the spool shaft so as to be integrally rotatable with the spool shaft. The spool shaft is configured so as to be rotatable with respect to the reel body 3. For example, the spool shaft is configured so as to be rotatable with respect to the first side plate 17 and the second side plate 19.

As shown in FIG. 1, the handle assembly 7 is operated in order to wind the fishing line around the spool 5. The handle assembly 7 is attached to the reel body 3 so as to be rotatable. For example, the handle assembly 7 is attached to the reel body 3 so as to be rotatable via the handle shaft 31 (refer to FIG. 2).

The handle assembly 7 has a handle arm 23 and a handle knob 25. The handle arm 23 is mounted on the handle shaft 31 so as to be integrally rotated with the handle shaft 31

(refer to FIG. 2). The handle knob 25 is attached to the handle arm 23 so as to be rotatable.

The first support structure 9 supports the handle shaft 31 such that the handle shaft 31 can be rotated relative to the reel body 3. As shown in FIGS. 1 and 2, the first support structure 9 is disposed between the spool 5 and the handle assembly 7. For example, the first support structure 9 is disposed between the handle assembly 7 and the second side plate 19 of the frame 11.

Figure 4:
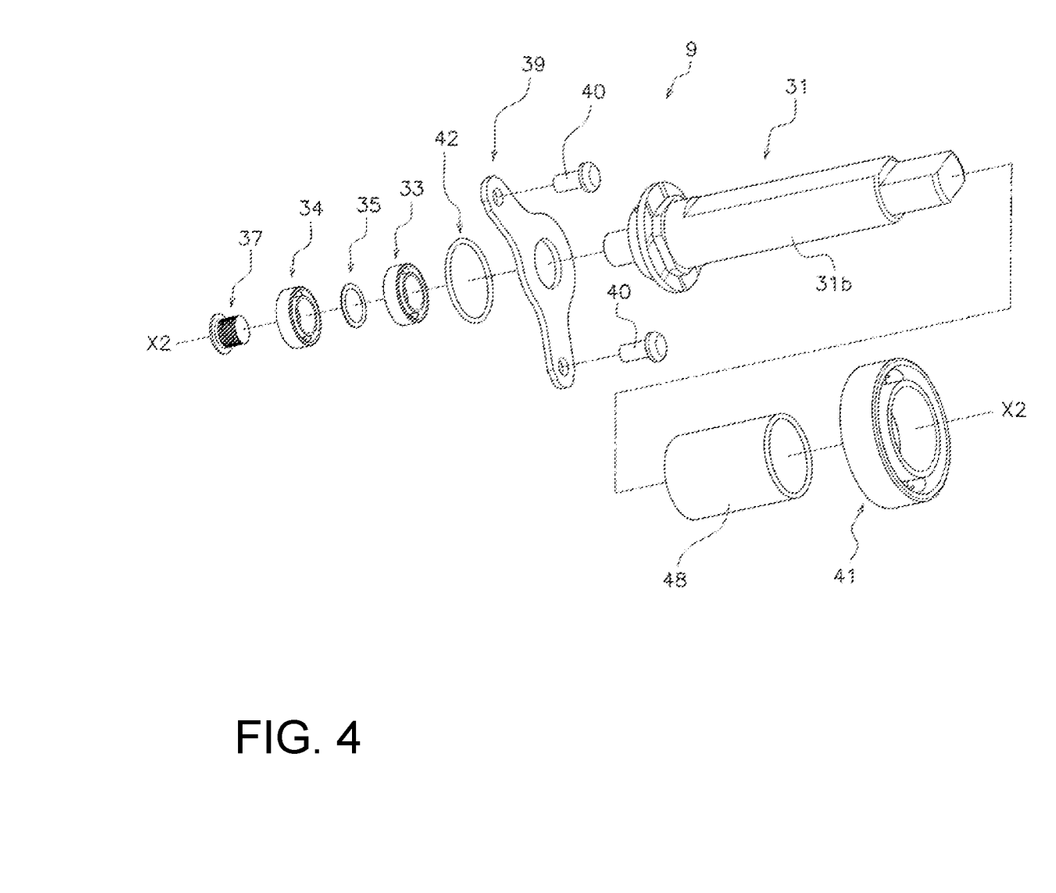
FIG. 4 is an exploded perspective view of the first support structure.
Figure 5:
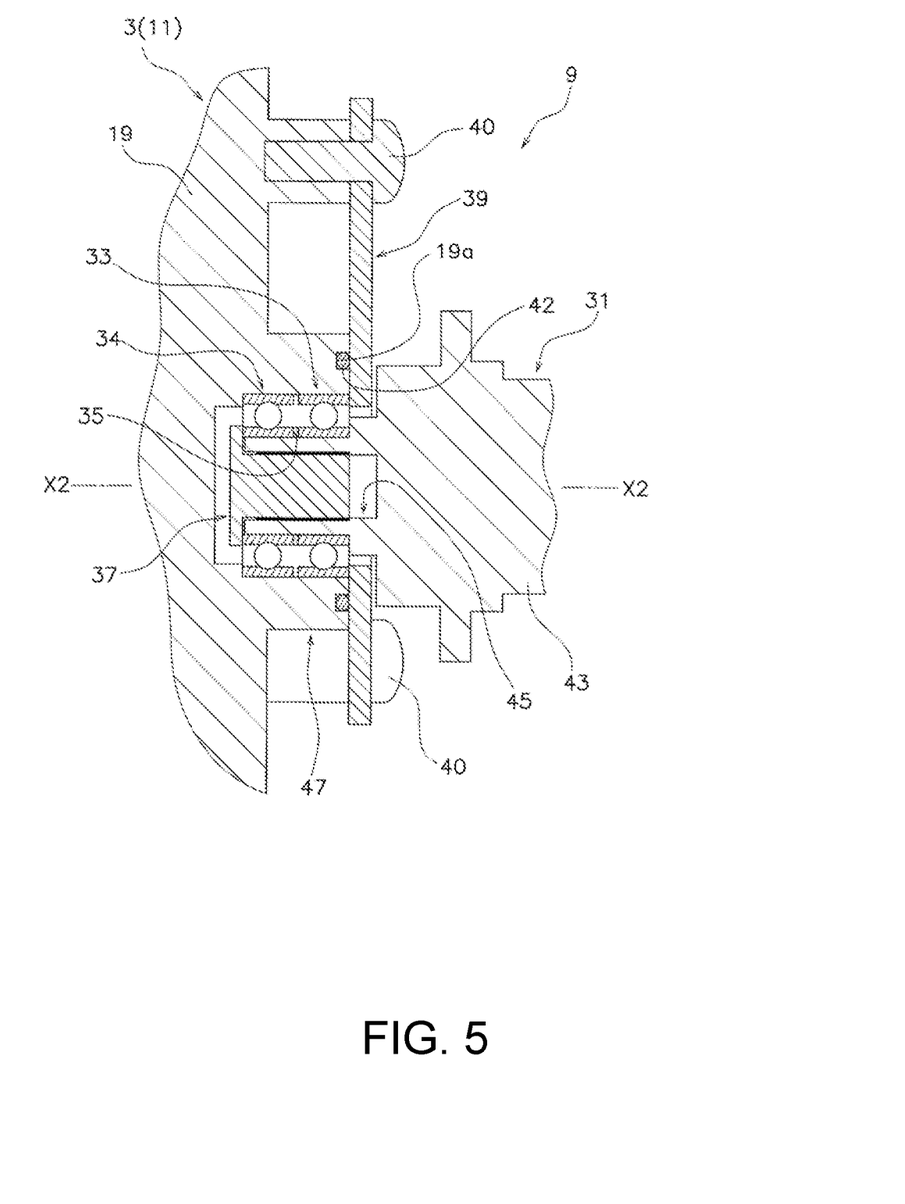
FIG. 5 is a cross-sectional view of the first support structure.

As shown in FIGS. 4 and 5, the first support structure 9 comprises the handle shaft 31 (one example of the first portion), the reel body 3 (one example of the second portion), a first shaft bearing 33 and a second shaft bearing 34, a first spacer 35, a first positioning member 37, and a first regulating member 39. As shown in FIG. 4, the first support structure 9 further comprises a third shaft bearing 41 and a seal member 42.

The handle shaft 31 is formed in the shape of a shaft, and is connected to the handle assembly 7 (refer to FIG. 1). For example, one end portion of the handle shaft 31 is inserted through the inner peripheral portion of the boss portion 15a of the second side cover 15 (refer to FIG. 1). The distal end of the one end portion of the handle shaft 31 is connected to the handle arm 23 of the handle assembly 7 (refer to FIG. 1) so as to be integrally rotatable.

As shown in FIG. 2, the handle shaft 31 is supported by the reel body 3 so as to be rotatable. As shown in FIG. 5, the handle shaft 31 is supported by the second side plate 19 of the reel body 3 (frame 11) so as to be rotatable via the first shaft bearing 33 and the second shaft bearing 34. In addition, the handle shaft 31 is supported by the boss portion 15a of the second side cover 15 (refer to FIG. 1) so as to be rotatable via the third shaft bearing 41 (refer to FIG. 4).

As shown in FIG. 5, the handle shaft 31 has a shaft body 43 and a mounting portion 45. The shaft body 43 is formed essentially in the shape of a shaft. The shaft body 43 is supported by a boss portion 15a (refer to FIG. 1) of the second side cover 15 so as to be rotatable via the third shaft bearing 41.

A mounting portion 45 forms one end portion of the handle shaft 31. The mounting portion 45 projects from an end portion of a shaft body 43 in the axial direction along axis X2 of the handle shaft 31. The mounting portion 45 is supported on a mounted portion 47 (described further below) of the second side plate 19 so as to be rotatable via the first shaft bearing 33 and the second shaft bearing 34.

Figure 6A:
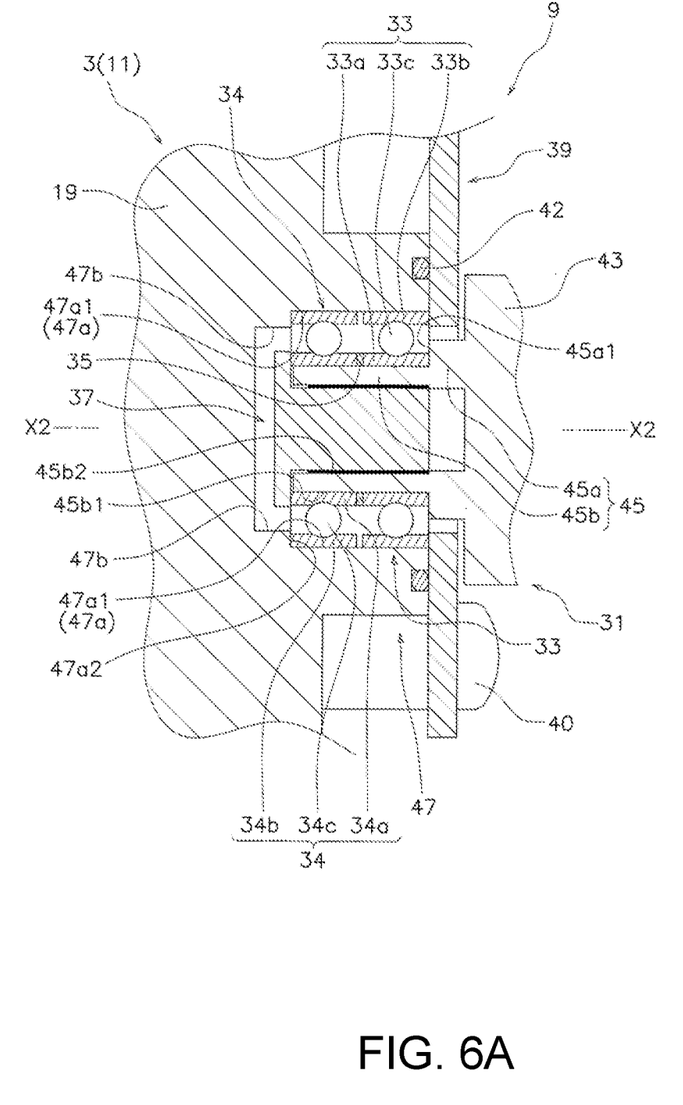
FIG. 6A is an enlarged cross-sectional view of the first support structure.

As shown in FIG. 6A, the mounting portion 45 is essentially tubular in form. The mounting portion 45 has a large diameter portion 45a and a small diameter portion 45b. Axis X2 of the handle shaft 31 passes through the center of the large diameter portion 45a and the center of the small diameter portion 45b.

The large diameter portion 45a is disposed at the end portion of the shaft body 43. The large diameter portion 45a forms the proximal end portion of the mounting portion 45. The small diameter portion 45b projects from the large diameter portion 45a in the axial direction along axis X2 of the handle shaft 31. The small diameter portion 45b has an outer circumferential surface 45b1 (one example of the outer circumferential surface of the first portion) and a female threaded portion 45b2. The female threaded portion 45b2 is formed on the inner circumferential surface of the small diameter portion 45b. The outer diameter of the small diameter portion 45b is smaller than the outer diameter of the large diameter portion 45a.

Since the large diameter portion 45a and the small diameter portion 45b are formed in this manner, the distal end surface of the large diameter portion 45a forms a first annular surface 45a1 (one example of the first contact surface) that extends annularly around axis X2 of the handle shaft 31. That is, the handle shaft 31 (large diameter portion 45a of the mounting portion 45) includes the first annular surface 45a1.

As shown in FIGS. 3, 5, and 6A, the reel body 3 has a mounted portion 47. For example, the second side plate 19 has the mounted portion 47. The mounted portion 47 is formed with a concave shape on the second side plate 19.

As shown in FIG. 6A, the mounted portion 47 has a large-diameter hole portion 47a and a small-diameter hole portion 47b. The axis X2 of the handle shaft 31 passes through the center of the large-diameter hole portion 47a and the center of the small-diameter hole portion 47b. The large-diameter hole portion 47a is formed on the opening side of the mounted portion 47. The inner circumferential surface 47a1 (one example of the inner circumferential surface of the second portion) of the large-diameter hole portion 47a is disposed opposite the outer circumferential surface 45b1 of the mounting portion 45 on the handle shaft 31 in the radial direction away from axis X2 of the handle shaft 31.

The small-diameter hole portion 47b is formed with a concave shape at the bottom portion of the large-diameter hole portion 47a. The internal diameter of the small-diameter hole portion 47b is smaller than the internal diameter of the large-diameter hole portion 47a.

Since the large-diameter hole portion 47a and the small-diameter hole portion 47b are formed in this manner, the bottom portion of the large-diameter hole portion 47a forms a second annular surface 47a2 (one example of the second contact surface) that extends annularly around the axis X2 of the handle shaft 31. That is, the reel body 3 (mounted portion 47) includes the second annular surface 47a2.

As shown in FIGS. 4, 5, and 6A, the first shaft bearing 33 and the second shaft bearing 34 are arranged axially side by side along axis X2 of the handle shaft 31 between the outer circumferential surface 45b1 of the handle shaft 31 (mounting portion 45) and the inner circumferential surface 47a1 of the reel body 3 (mounted portion 47).

For example, as shown in FIG. 6A, the first shaft bearing 33 and the second shaft bearing 34 are disposed between the outer circumferential surface 45b1 of the mounting portion 45 (small diameter portion 45b) and the inner circumferential surface 47a1 of the large-diameter hole portion 47a of the mounted portion 47 in the radial direction away from axis X2 of the handle shaft 31. The first shaft bearing 33 and the second shaft bearing 34 are arranged axially and side by side, separately from each other along axis X2 of the handle shaft 31.

Specifically, the first shaft bearing 33 has an inner race 33a, an outer race 33b, and rolling elements 33c disposed between the inner race 33a and the outer race 33b. The second shaft bearing 34 has an inner race 34a, an outer race 34b, and rolling elements 34c disposed between the inner race 34a and the outer race 34b.

As shown in FIG. 6A, the inner race 33a of the first shaft bearing 33 and the inner race 34a of the second shaft bearing 34 are arranged axially, separately from each other along axis X2 of the handle shaft 31. The outer race 33b of the first shaft bearing 33 and the outer race 34b of the second shaft bearing 34 are arranged axially, separately from each other along axis X2 of the handle shaft 31.

The inner race 33a of the first shaft bearing 33 and the inner race 34a of the second shaft bearing 34 are in contact with the outer circumferential surface 45b1 of the mounting portion 45 (small diameter portion 45b). The first annular surface 45a1 of the handle shaft 31 (mounting portion 45) can contact the inner race 33a of the first shaft bearing 33 in the axial direction along axis X2 of the handle shaft 31.

The outer race 33b of the first shaft bearing 33 and the outer race 34b of the second shaft bearing 34 are in contact with the inner circumferential surface 47a1 of the large-diameter hole portion 47a of the mounted portion 47. The second annular surface 47a2 of the reel body 3 (mounted portion 47) can contact the outer race 34b of the second shaft bearing 34 in the axial direction along axis X2 of the handle shaft 31.

As shown in FIG. 4, the third shaft bearing 41 is disposed between an outer circumferential surface 31b of the handle shaft 31 and the boss portion 15a of the second side cover 15 (refer to FIG. 1). For example, the inner race of the third shaft bearing 41 is mounted on the outer circumferential surface 31b of the handle shaft 31 via a tubular member 48. The outer race of the third shaft bearing 41 is mounted on the inner circumferential surface of the boss portion 15a of the second side cover 15 (refer to FIG. 1).

As shown in FIGS. 4, 5, and 6A, the first spacer 35 is disposed between the inner race 33a of the first shaft bearing 33 and the inner race 34a of the second shaft bearing 34. For example, the first spacer 35 is formed with an annular shape. The first spacer 35 is disposed on the outer circumferential surface 45b1 of the mounting portion 45 (small diameter portion 45b) between the inner race 33a of the first shaft bearing 33 and the inner race 34a of the second shaft bearing 34 in the axial direction.

As shown in FIG. 6A, in a state in which the first spacer 35 is in contact with the inner race 33a of the first shaft bearing 33 and the inner race 34a of the second shaft bearing 34 between the inner race 33a of the first shaft bearing 33 and the inner race 34a of the second shaft bearing 34, the axial lengths of the inner race 33a of the first shaft bearing 33, the inner race 34a of the second shaft bearing 34, and the first spacer 35 are longer than the axial length of the small diameter portion 45b of the mounting portion 45. The axial length from the first annular surface 45a1 of the mounting portion 45 to the tip of the small diameter portion 45b of the mounting portion 45 can be taken as the axial length of the small diameter portion 45b of the mounting portion 45.

By this configuration, in a state in which the inner race 33a of the first shaft bearing 33, the inner race 34a of the second shaft bearing 34, and the first spacer 35 are disposed on the outer circumferential surface 45b1 of the small diameter portion 45b of the mounting portion 45, the inner race 34a of the second shaft bearing 34 projects from the tip of the small diameter portion 45b of the mounting portion 45.

As shown in FIG. 6A, the first positioning member 37 positions the inner race 33a of the first shaft bearing 33, the inner race 34a of the second shaft bearing 34, and the first spacer 35 on the handle shaft 31 in the axial direction along axis X2 of the handle shaft 31. The first positioning member 37 positions the inner race 34a of the second shaft bearing 34 at a prescribed position with respect to the first annular surface 45a1. The first positioning member 37 is attached to the mounting portion 45 of the handle shaft 31. For example, the first positioning member 37 is attached to the small diameter portion 45b of the mounting portion 45.

Figure 6B:
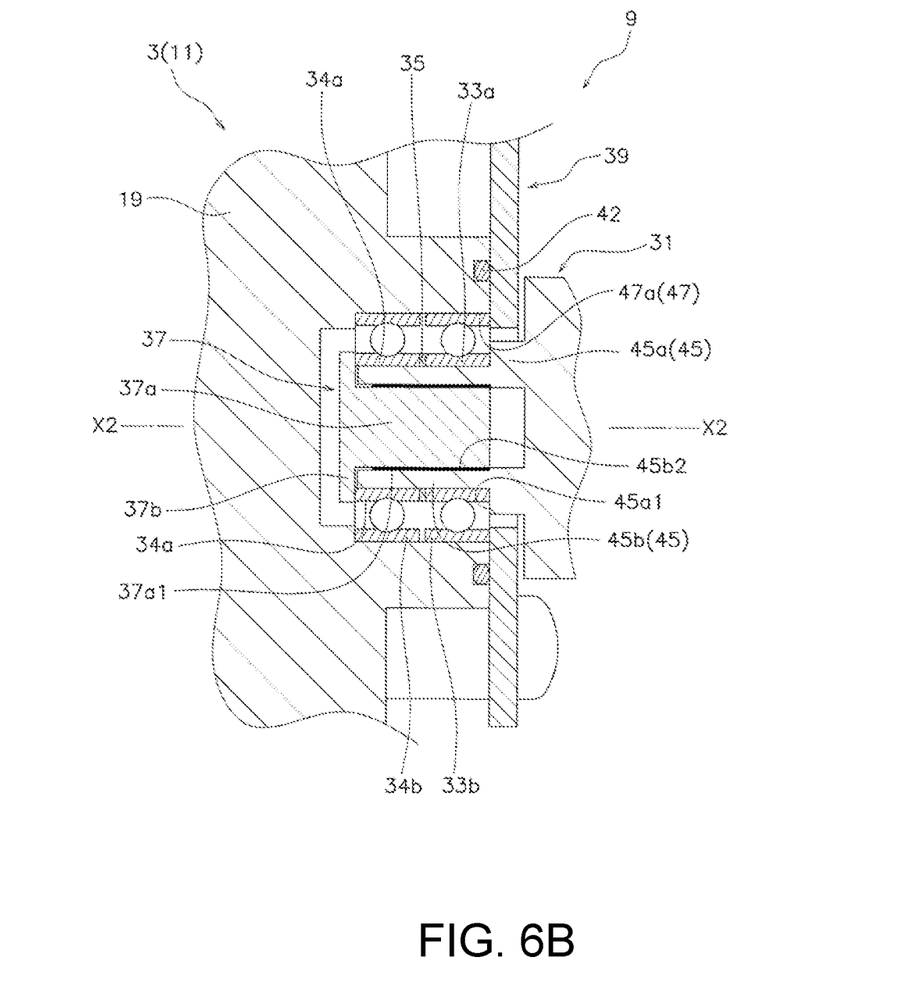
FIG. 6B is an enlarged cross-sectional view of the first support structure.

As shown in FIG. 6B, the first positioning member 37 has a body portion 37a and a flange portion 37b. The body portion 37a is formed in a cylindrical shape. The body portion 37a has a male threaded portion 37a1. The male threaded portion 37a1 is formed on the outer circumferential surface of the body portion 37a. The male threaded portion 37a1 is threaded into the female threaded portion 45b2 disposed on the inner circumferential surface of the small diameter portion 45b. The flange portion 37b is a disk alongside the body portion 37a. The flange portion 37b projects in an annular shape from the outer circumferential surface 45b1 of the body portion 37a. The flange portion 37b can contact the inner race 34a of the second shaft bearing 34.

By screwing the male threaded portion 37a1 of the body portion 37a into the female threaded portion 45b2 of the small diameter portion 45b, the flange portion 37b positions the inner race 34a of the second shaft bearing 34 at a prescribed position with respect to the first annular surface 45a1. The inner race 33a of the first shaft bearing 33, the inner race 34a of the second shaft bearing 34, and the first spacer 35 are thereby positioned on the handle shaft 31 in the axial direction along axis X2 of the handle shaft 31.

Here, in a state in which the first regulating member 39 is not mounted, the axial lengths of the outer race 33b of the first shaft bearing 33, the outer race 34b of the second shaft bearing 34, and the gap between the outer race 33b of the first shaft bearing 33 and the outer race 34b of the second shaft bearing 34 are slightly shorter than the axial length of the large-diameter hole portion 47a of the mounted portion 47. By this configuration, the outer race 33b of the first shaft bearing 33 is slightly recessed from the open end of the large-diameter hole portion 47a of the mounted portion 47 in the axial direction along axis X2 of the handle shaft 31.

As shown in FIG. 5, the seal member 42 is disposed between the first regulating member 39 and the second side plate 19 of the reel body 3 (frame 11). For example, the seal member 42 is arranged in between a recess 19a of the second side plate 19 and the first regulating member 39 while being pressed by the first regulating member.

As shown in FIG. 2, the first regulating member 39 is mounted on the reel body 3. For example, as shown in FIGS. 5 and 6A, the first regulating member 39 is fixed to the second side plate 19 by a screw member 40 in a state in which the first regulating member contacts the outer race 33b of the first shaft bearing 33.

As a result, the first regulating member 39 restricts the movement of the outer race 33b of the first shaft bearing 33 in the axial direction along axis X2 of the handle shaft 31. For example, as shown in FIG. 6A, the first regulating member 39 restricts the movement of the outer race 33b of the first shaft bearing 33 in a direction in which the outer race 33b of the first shaft bearing 33 is separated from the second annular surface 47a2 of the reel body 3 (mounted portion 47).

Thus, since the first regulating member 39 restricts the movement of the outer race 33b of the first shaft bearing 33 in a direction in which the outer race 33b of the first shaft bearing 33 separates from the outer race 34b of the second shaft bearing 34, the axial distance between the outer race 33b of the first shaft bearing 33 and the outer race 34b of the second shaft bearing 34 is smaller than the axial distance between the inner race 33a of the first shaft bearing 33 and the inner race 34a of the second shaft bearing 34. That is, the gap between the outer race 33b of the first shaft bearing 33 and the outer race 34b of the second shaft bearing 34 is smaller. As a result, the play between the inner and outer races of the first shaft bearing 33 and the second shaft bearing 34 is suppressed.

The first support structure 9 having the configuration described above is assembled as follows. First, the seal member 42 is disposed on the second side plate 19. Next, the first shaft bearing 33, the first spacer 35, and the second shaft bearing 34 are arranged on the outer circumferential surface 45b1 of the mounting portion 45 (small diameter portion 45b) of the handle shaft 31. In this state, the first positioning member 37 is mounted on the mounting portion 45 (small diameter portion 45b) of the handle shaft 31. As a result, the first shaft bearing 33, the first spacer 35, and the second shaft bearing 34 are positioned on the handle shaft 31 by the first positioning member 37.

Next, the first shaft bearing 33, the first spacer 35, the second shaft bearing 34, the first positioning member 37, and the mounting portion 45 of the handle shaft 31 are disposed on the mounted portion 47 (large-diameter hole portion 47a) of the second side plate 19. In this state, the first regulating member 39 is mounted on the second side plate 19. As a result, the handle shaft 31 is supported so as to be rotatable with respect to the second side plate 19.

Next, the inner race of the third shaft bearing 41 is mounted on the handle shaft 31. In this state, the second side cover 15 (boss portion 15a) is mounted on the outer race of the third shaft bearing 41. The handle shaft 31 is thereby supported so as to be rotatable with respect to the second side cover 15. The assembly of members related to the rotation transmission mechanism is omitted.

In the first regulating member 9 of the dual-bearing reel 1 described above, since the first regulating member 39 restricts the movement of the outer race 34b of the second shaft bearing 34 in the direction in which the outer race 34b of the second shaft bearing 34 separates from the outer race 33b of the first shaft bearing 33, the internal gap between the first shaft bearing 33 and the second shaft bearing 34 is small. It is thus possible to suppress the rattling of the handle shaft 31 with respect to the reel body 3 (second side plate 19). In addition, in this embodiment, since no friction (or sliding resistance) is generated in the handle shaft 31, as in the prior art, the handle shaft 31 can be smoothly rotated with respect to the reel body 3 (second side plate 19).

Second Embodiment

Figure 7A:
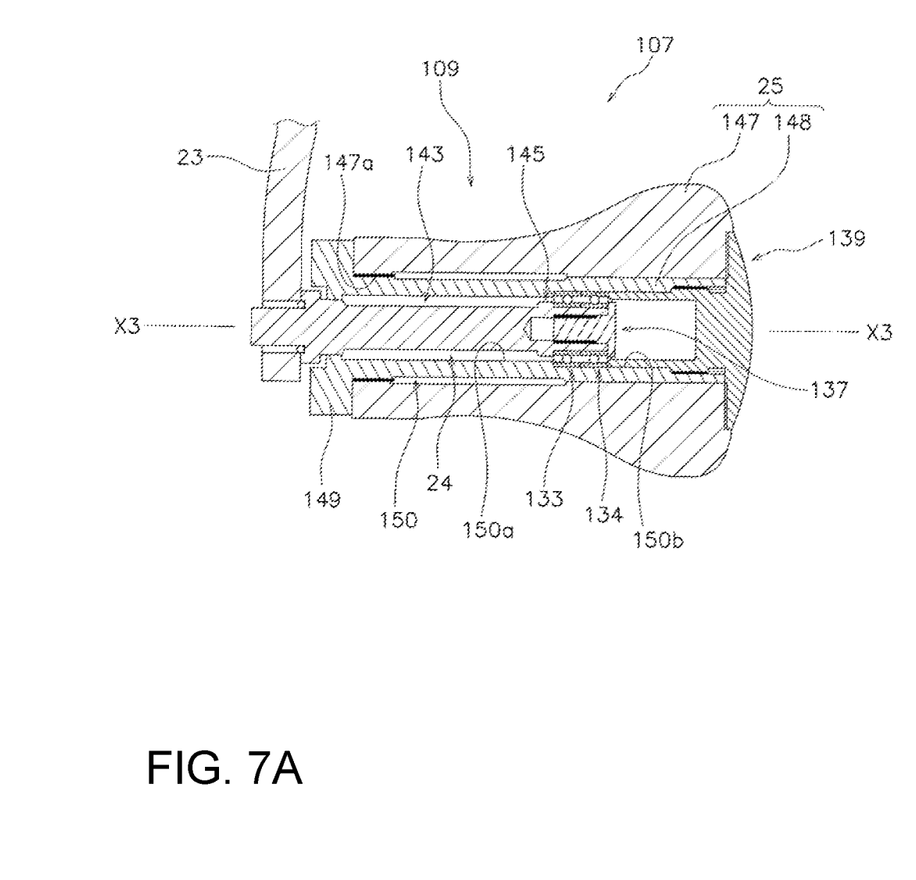
FIG. 7A is a cross-sectional view of a second support structure of a dual-bearing reel in which a second embodiment of the present invention is employed.

In the first embodiment described above, an example was presented in which the dual-bearing reel 1 comprises the first support structure 9. As shown in FIGS. 1 and 7A, the dual-bearing reel 1 can comprise a handle assembly 107 that includes a second support structure 109. Here, the second support structure 109 can be used in combination with the first support structure 9 described above, or be used alone without using the first support structure 9. Descriptions of configurations that are the same as those of the first embodiment will be omitted.

As described in the first embodiment, the handle assembly 107 is connected to the handle shaft 31. As shown in FIG. 7A, the handle assembly 107 has the second support structure 109. For example, the handle assembly 107 includes the handle arm 23, a knob shaft 24 (one example of the first portion) forming the second support structure 109, and the handle knob 25 (one example of the second portion) forming the second support structure 109. That is, the handle assembly 107 has the handle arm 23 and the second support structure 109.

The handle arm 23 is mounted on the handle shaft 31 so as to rotate integrally with the handle shaft 31. The knob shaft 24 is mounted on the handle arm 23. The second support structure 109 supports the handle knob 25 such that the handle knob 25 can be rotated relative to the knob shaft 24.

As shown in FIG. 7A, the second support structure 109 is disposed on the handle arm 23. The second support structure 109 comprises the knob shaft 24, the handle knob 25, a fourth shaft bearing 133 and a fifth shaft bearing 134, a second spacer 135 (refer to FIG. 7B), a second positioning member 137, and a second regulating member 139.

The knob shaft 24 is formed in the shape of a shaft. The knob shaft 24 is mounted on the handle arm 23. The knob shaft 24 supports the handle knob 25 so as to be rotatable via the fourth shaft bearing 133 and the fifth shaft bearing 134.

For example, the knob shaft 24 has a shaft body 143 and a mounting portion 145. The shaft body 143 is formed essentially in the shape of a shaft. One end portion of the shaft body 143 is mounted on the handle arm 23. The mounting portion 145 is disposed at the other end portion of the shaft body 143.

The configuration of the mounting portion 145 of the knob shaft 24 is essentially the same as that of the mounting portion 45 of the handle shaft 31 of the first embodiment. Therefore, the configuration of the mounting portion 145 of the knob shaft 24 will only be described briefly. The mounting portion 145 supports the handle knob 25 so as to be rotatable via the fourth shaft bearing 133 and the fifth shaft bearing 134. The mounting portion 145 is essentially tubular.

Figure 7B:
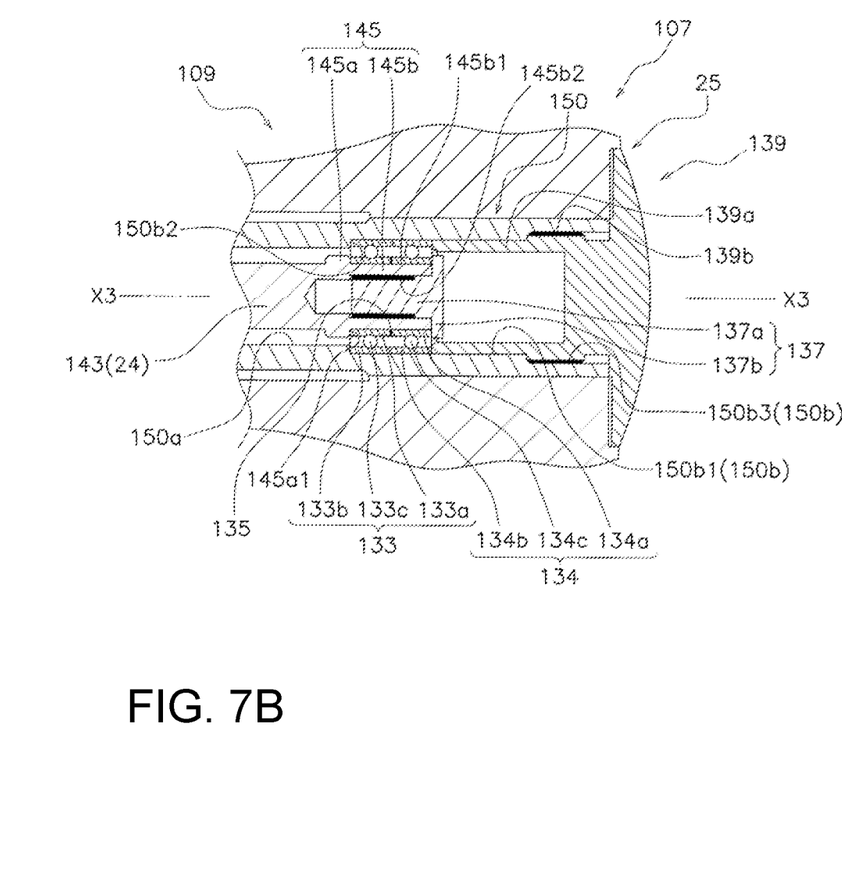
FIG. 7B is an enlarged cross-sectional view of the second support structure.

As shown in FIG. 7B, the mounting portion 145 has a large diameter portion 145a and a small diameter portion 145b. The large diameter portion 145a is disposed at an end portion of the shaft body 143. The small diameter portion 145b has an outer circumferential surface 145b1 (one example of the outer circumferential surface of the first portion) and a female threaded portion 145b2 formed on the inner circumferential surface.

Since the large diameter portion 145a and the small diameter portion 145b are formed in this manner, the distal end surface of the large diameter portion 145a forms a third annular surface 145a1 (one example of the first contact surface) that extends annularly around axis X3 of the handle shaft 24. That is, the knob shaft 24 (mounting portion 145) includes the third annular surface 145a1. The inner race 133a of the fourth shaft bearing 133 can contact the third annular surface 145a1 in the axial direction.

As shown in FIG. 7A, the handle knob 25 has a first knob body 147 and a second knob body 148. The first knob body 147 is the part that is to be grasped by the angler. As shown in FIG. 7B, the first knob body 147 has a hole portion 147a. The second knob body 148 threads into the hole portion 147a of the first knob body 147.

The second knob body 148 has a first tubular portion 149 and a second tubular portion 150. The knob shaft 24 is disposed inside the first tubular portion 149 and the second tubular portion 150. The shaft body 143 is disposed in the first tubular portion 149. The first tubular portion 149 can contact the first knob body 147. The outer diameter of the first tubular portion 149 is larger than the outer diameter of the second tubular portion 150.

The second tubular portion 150 is integrally formed with the first tubular portion 149. The shaft body 143 and the mounting portion 145 are disposed in the second tubular portion 150. The second tubular portion 150 has a small diameter portion 150a and a large diameter portion 150b. Axis X3 of the handle shaft 24 passes through the center of the small diameter portion 150a and the center of the large diameter portion 150b.

As shown in FIG. 7A, the small diameter portion 150a is formed on the handle arm 23 side. As shown in FIG. 7B, the shaft body 143 and the large diameter portion 145a are disposed inside the small diameter portion 150a. The internal diameter of the small diameter portion 150a is smaller than the internal diameter of the large diameter portion 150b.

As shown in FIG. 7A, the large diameter portion 150b is formed on the side away from the handle arm 23. As shown in FIG. 7B, the small diameter portion 145b is disposed inside the large diameter portion 150b. The inner circumferential surface 150b1 (one example of the inner circumferential surface of the second portion) of the large-diameter hole portion 150b is disposed opposite the outer circumferential surface 145b1 of the knob shaft 24 (small diameter portion 145b) in a radial direction away from the axis X3 of the handle shaft 24.

Since the small diameter portion 150a and the large diameter portion 150b are formed in this manner, the bottom portion of the large diameter portion 150b forms a fourth annular surface 150b2 (one example of the second contact surface) that extends annularly around axis X3 of the handle shaft 24. That is, the handle knob 25 (second knob body 148) includes the fourth annular surface 150b2. The outer race 133b of the fourth shaft bearing 133 can contact the fourth annular surface 150b2 in the axial direction.

As shown in FIG. 7B, the fourth shaft bearing 133 has an inner race 133a, an outer race 133b, and rolling elements 133c disposed between the inner race 133a and the outer race 133b. The fifth shaft bearing 134 has an inner race 134a, an outer race 134b, and rolling elements 134c disposed between the inner race 134a and the outer race 134b.

The fourth shaft bearing 133 and the fifth shaft bearing 134 are disposed between the outer circumferential surface 145b1 of the knob shaft 24 (outer circumferential surface 145b1 of the small diameter portion 145b) and the inner circumferential surface 150b1 of the handle knob 25 (inner circumferential surface 150b1 of the large diameter portion 150b) in the radial direction. The fourth shaft bearing 133 and the fifth shaft bearing 134 are arranged axially side by side along axis X3 of the handle shaft 24 between the outer circumferential surface 145b1 of the knob shaft 24 and the inner circumferential surface 150b1 of the handle knob 25.

The inner race 133a of the fourth shaft bearing 133 and the inner race 134a of the fifth shaft bearing 134 are arranged axially, separately from each other along axis X3 of the handle shaft 24. The outer race 133b of the fourth shaft bearing 133 and the outer race 134b of the fifth shaft bearing 134 are arranged axially, separately from each other along axis X3 of the handle shaft 24.

The inner race 133a of the fourth shaft bearing 133 and the inner race 134a of the fifth shaft bearing 134 are in contact with the outer circumferential surface 145b1 of the knob shaft 24 (outer circumferential surface 145b1 of the small diameter portion 145b). The inner race 133a of the fourth shaft bearing 133 cam contact the third annular surface 145a1 of the knob shaft 24 in the axial direction along axis X3 of the handle shaft 24.

The outer race 133b of the fourth shaft bearing 133 and the outer race 134b of the fifth shaft bearing 134 are in contact with the inner circumferential surface 150b1 of the handle knob 25 (inner circumferential surface 150b1 of the large diameter portion 150b). The outer race 133b of the fourth shaft bearing 133 can contact the fourth annular surface 150b2 of the handle knob 25 (fourth annular surface 150b2 of the second knob body 148) in the axial direction along axis X3 of the handle shaft 24.

As shown in FIG. 7B, the second spacer 135 is disposed between the inner race 133a of the fourth shaft bearing 133 and the inner race 134a of the fifth shaft bearing 134. For example, the second spacer 135 is formed with an annular shape. The second spacer 135 is disposed on the outer circumferential surface 145b1 of the knob shaft 24 (outer circumferential surface 145b1 of the small diameter portion 145b) between the inner race 133a of the fourth shaft bearing 133 and the inner race 134a of the fifth shaft bearing 134 in the axial direction.

In a state in which the second spacer 135 is in contact with the inner race 133a of the fourth shaft bearing 133 and the inner race 134a of the fifth shaft bearing 134, the axial lengths of the inner race 133a of the fourth shaft bearing 133, the inner race 134a of the fifth shaft bearing 134, and the second spacer 135 are longer than the axial length of the small diameter portion 145b of the mounting portion 145. The axial length from the third annular surface 145a1 of the mounting portion 145 to the tip of the small diameter portion 145b of the mounting portion 145 can be taken as the axial length of the small diameter portion 145b of the mounting portion 145.

By this configuration, in a state in which the inner race 133a of the fourth shaft bearing 133, the inner race 134a of the fifth shaft bearing 134, and the second spacer 135 are disposed on the outer circumferential surface 145b1 of the small diameter portion 145b of the mounting portion 145, the inner race 134a of the fifth shaft bearing 134 projects slightly from the tip of the small diameter portion 145b of the mounting portion 145 in the axial direction along axis X3 of the handle shaft 24.

The second positioning member 137 positions the inner race 133a of the fourth shaft bearing 133, the inner race 134a of the fifth shaft bearing 134, and the second spacer 135 in the axial direction with respect to the knob shaft 24. The second positioning member 137 positions the inner race 134a of the fifth shaft bearing 134 at a prescribed position with respect to the third annular surface 145a1. The second positioning member 137 is attached to the mounting portion 145 of the knob shaft 24. For example, the second positioning member 137 is attached to the small diameter portion 145b of the mounting portion 145. Here, since the inner race 134a of the fifth shaft bearing 134 projects slightly from the tip of the small diameter portion 145b of the mounting portion 145 in the axial direction along the axis X3 of the handle shaft 24, the second positioning member 137 presses the inner race 134a of the fifth shaft bearing 134 toward the third annular surface 145a1.

As shown in FIG. 7B, the second positioning member 137 has a body portion 137a and a flange portion 137b. The configuration of the second positioning member 137 is essentially the same as the configuration of the first positioning member 37. By screwing the male threaded portion of the body portion 137a into the female threaded portion 145b2 of the small diameter portion 145b, the flange portion 137b restricts the movement of the inner race 134a of the fifth shaft bearing 134 in a direction in which the inner race 134a of the fifth shaft bearing 134 separates from the third annular surface 145a1. As a result, the inner race 133a of the fourth shaft bearing 133, the inner race 134a of the fifth shaft bearing 134, and the second spacer 135 are positioned on the knob shaft 24 in the axial direction along the axis X3 of the handle shaft 24.

As shown in FIG. 7A, the second regulating member 139 is mounted on the handle knob 25. For example, the second regulating member 139 is mounted on the second knob body 148 of the handle knob 25. Specifically, as shown in FIG. 7B, the second regulating member 139 has a hollow cylindrical portion 139a on the distal end side and a male threaded portion 139b on the proximal end side. The male threaded portion 139b is threaded into a female threaded portion 150b3 of the second tubular portion 150 (large diameter portion 150b). As a result, the distal end of the hollow cylindrical portion 139a of the second regulating member 139 can contact the outer race 134b of the fifth shaft bearing 134. In this state, the second regulating member 139 restricts the movement of the outer race 134b of the fifth shaft bearing 134 in a direction in which the outer race 134b of the fifth shaft bearing 134 separates from the outer race 133b of the fourth shaft bearing 133 (the axial direction along axis X3 of the handle shaft 24). For example, the second regulating member 139 restricts the movement of the outer race 134b of the fifth shaft bearing 134 in a direction in which the outer race 134b of the fifth shaft bearing 134 separates from the fourth annular surface 150b2 of the handle knob 25 (second knob body 148).

In this manner, because the movement of the outer race 134b of the fifth shaft bearing 134 is restricted by the second regulating member 139 in a direction in which the outer race 134b of the fifth shaft bearing 134 separates from the outer race 133b of the fourth shaft bearing 133, the axial distance between the outer race 133b of the fourth shaft bearing 133 and the outer race 134b of the fifth shaft bearing 134 becomes smaller than the axial distance between the inner race 133a of the fourth shaft bearing 133 and the inner race 134a of the fifth shaft bearing 134. That is, the gap between the outer race 133b of the fourth shaft bearing 133 and the outer race 134b of the fifth shaft bearing 134 is smaller. The fourth shaft bearing 133 and the fifth shaft bearing 134 are thus preloaded, and the play between the inner and outer races is suppressed.

The second support structure 109, which has the configuration described above, is assembled as follows. First, in a state in which the handle knob 25 is mounted on the outer periphery of the knob shaft 24, the fourth shaft bearing 133, the second spacer 135, and the fifth shaft bearing 134 are disposed between the outer circumferential surface 145b1 of the mounting portion 145 (small diameter portion 145b) of the knob shaft 24 and the inner circumferential surface 150b1 of the handle knob 25 (second tubular portion 150). In this state, the second positioning member 137 is mounted on the mounting portion 145 (small diameter portion 145b) of the knob shaft 24. The fourth shaft bearing 133, the second spacer 135, and the fifth shaft bearing 134 are thus positioned on the knob shaft 24 by the second positioning member 137.

Next, the second regulating member 139 is threaded into the large diameter portion 150b of the handle knob 25. The second regulating member 139 restricts the movement of the outer race 134b of the fifth shaft bearing 134 in a direction in which the outer race 134b of the fifth shaft bearing 134 separates from the outer race 133b of the fourth shaft bearing 133. The knob shaft 24 thus supports the handle knob 25 so as to be rotatable.

In the second support structure 109 of the dual-bearing reel 1 described above, because the second regulating member 139 restricts the movement of the outer race 134b of the fifth shaft bearing 134 in a direction in which the outer race 134b of the fifth shaft bearing 134 separates from the outer race 133b of the fourth shaft bearing 133, the internal gap between the fourth shaft bearing 133 and the fifth shaft bearing 134 is small. The rattling of the knob shaft 24 with respect to the handle knob 25 can thereby be suppressed. Further, in this case, since it is possible to reduce the friction of the knob shaft 24, the handle knob 25 can be smoothly rotated with respect to the knob shaft 24.

Other Embodiments

One embodiment of the present invention was described above, but the present invention is not limited to the above-described embodiment, and various modifications can be made without departing from the scope of the invention. For example, the use of "contact" in the present embodiment means not just direct contact, but that other members may be interposed as well, as in the following embodiment.

Figure 8A:
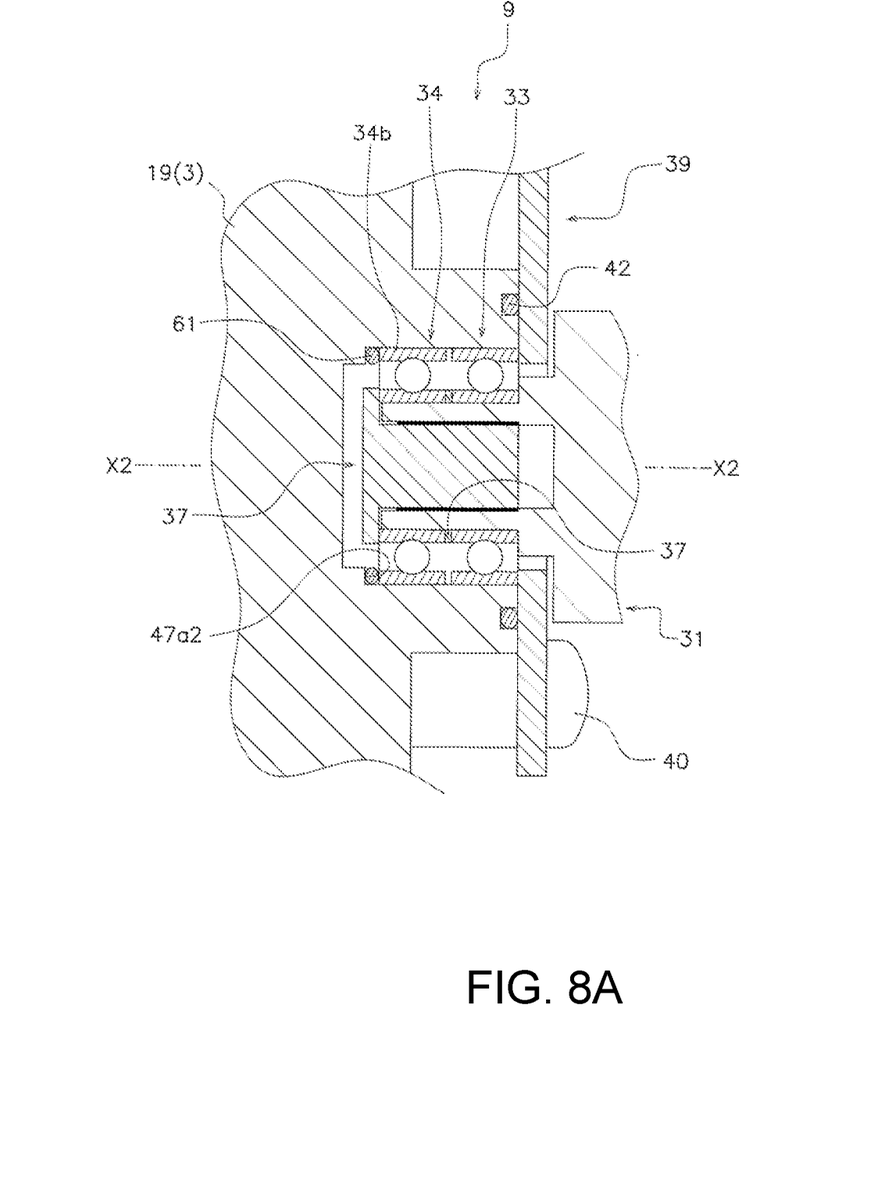
FIG. 8A is a cross-sectional view of a first support structure of a dual-bearing reel in which another embodiment of the present invention is employed.
Figure 8B:
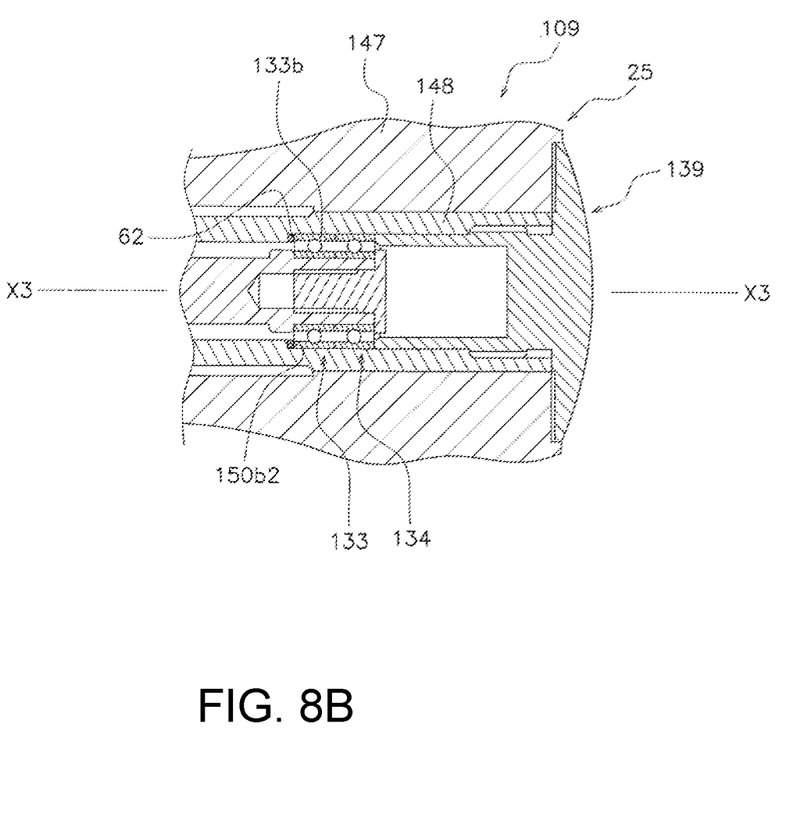
FIG. 8B is a cross-sectional view of a second support structure of a dual-bearing reel in which another embodiment of the present invention is employed.

As shown in FIGS. 8A and 8B, the first support structure 9 and the second support structure 109 can further include a first elastic member 61 and a second elastic member 62, respectively.

For example, as shown in FIG. 8A, in the first support structure 9, the first elastic member 61 is disposed between the reel body 3 (second side plate 19) and the outer race 34b of the second shaft bearing 34 in the axial direction along the axis X2 of the handle shaft 31. Further, as shown in FIG. 8B, in the second support structure 109, the second elastic member 62 is disposed between the handle knob 25 (second knob body 148) and the outer race 133b of the fourth shaft bearing 133 in the axial direction along the axis X3 of the handle shaft 24.

For example, the first elastic member 61 and the second elastic member 62 are O-rings. The first elastic member 61 is disposed between the outer race 34b of the second shaft bearing 34 and the second annular surface 47a2 of the reel body 3 in the axial direction along the axis X2 of the handle shaft 31. The second elastic member 62 is disposed between the outer race 133b of the fourth shaft bearing 133 and the fourth annular surface 150b2 of the handle knob 25 in the axial direction along the axis X3 of the knob shaft 24.

The arrangement of the first elastic member 61 and the second elastic member 62 in this manner allows for the simple adjustment of the preload that acts on each shaft bearing (first and second shaft bearings 33, 34/fourth and fifth shaft bearings 133, 134). In addition, when external vibrations are applied to each shaft bearing (first and second shaft bearings 33, 34/fourth and fifth shaft bearings 133, 134), such vibrations can be absorbed by the first and second elastic members 61, 62.

A spacer can be disposed instead of the first elastic member 61 and/or the second elastic member 62 of the embodiment described above. In this embodiment, the spacer is preferably a retaining ring or a collar. Further, a spacer can be used in combination with the first elastic member 61 and/or the second elastic member 62 of the embodiment described above.

If the first elastic member 61 and/or the spacer is used, the outer race 34b of the second shaft bearing 34 can contact the second annular surface 47a2 of the reel body 3 via the first elastic member 61 and/or the spacer. In addition, if the second elastic member 62 and/or the spacer is used, the outer race 133b of the fourth shaft bearing 133 can contact the fourth annular surface 150b2 in the axial direction via the second elastic member 62 and/or the spacer.

In the first and second embodiments, examples were presented in which the first support structure 9 and/or the second support structure 109 is applied to the dual-bearing reel 1, but a support structure corresponding to the first support structure 9 and/or the second support structure 109 may be applied to other types of reels.

What is claimed is:
1. A support structure for a fishing reel, comprising:
  a first portion formed in the shape of a shaft and having an outer circumferential surface;
  a second portion disposed to oppose the outer circumferential surface in a radial direction away from an axis of the first portion and having an inner circumferential surface;

a first shaft bearing and a second shaft bearing arranged side by side in the axial direction along the axis between the outer circumferential surface and the inner circumferential surface;

a spacer disposed between an inner race of the first shaft bearing and an inner race of the second shaft bearing; and a regulating member configured to restrict movement of either an outer race of the first shaft bearing or an outer race of the second shaft bearing, in a direction in which one of either the outer race of the first shaft bearing or the outer race of the second shaft bearing is separated from the other of the outer race of the first shaft bearing or the outer race of the second shaft bearing, such that an axial distance between the outer race of the first shaft bearing and the outer race of the second shaft bearing is smaller than an axial distance between the inner race of the first shaft bearing and the inner race of the second shaft bearing.

2. The support structure for a fishing reel according to claim 1, further comprising a positioning member positioning the inner race of the first shaft bearing, the inner race of the second shaft bearing, and the spacer in the axial direction with respect to the first portion.

3. The support structure for a fishing reel according to claim 2, wherein the first portion has a first contact surface with which one of either the inner race of the first shaft bearing or the inner race of the second shaft bearing contacts in the axial direction, and the positioning member is configured to position the other of the inner race of the first shaft bearing or the inner race of the second shaft bearing, at a prescribed position with respect to the first contact surface.

4. The support structure for a fishing reel according to claim 1, wherein the second portion has a second contact surface with which the either the outer race of the second shaft bearing or the outer race of the first shaft bearing contacts in the axial direction.

5. The support structure for a fishing reel according to claim 1, further comprising an elastic member disposed between the second portion and the either the outer race of the second shaft bearing or the outer race of the first shaft bearing in the axial direction.

6. A fishing reel, comprising
a spool, around which a fishing line is capable of being wound;
a handle assembly configured to wind the fishing line around the spool;
the support structure according to claim 1 disposed between the spool and the handle assembly,
the support structure including a drive shaft to which the handle assembly is connected; and
a reel body that supports the drive shaft so as to be rotatable,
the first portion is included in the drive shaft, and
the second portion is included in the reel body.

7. A fishing reel, comprising
a reel body;
a drive shaft that is supported by the reel body so as to be rotatable; and
a handle assembly having the support structure according to claim 1 and that is connected to the drive shaft,
the handle assembly including a handle knob and a knob shaft that supports the handle knob so as to be rotatable,
the first portion is included in the knob shaft, and
the second portion is included in the handle knob.

* * * * *